(12) United States Patent
Hodroj

(10) Patent No.: US 10,091,168 B2
(45) Date of Patent: Oct. 2, 2018

(54) WIRELESS ACCESS POINT SECURITY

(71) Applicant: T-Mobile USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 6 days.

(21) Appl. No.: 14/979,510

(22) Filed: Dec. 27, 2015

(65) Prior Publication Data

US 2017/0187688 A1     Jun. 29, 2017

(51) Int. Cl.

| H04L 29/06 | (2006.01) |
| H04L 12/46 | (2006.01) |
| H04M 15/00 | (2006.01) |
| H04L 12/851 | (2013.01) |
| H04W 76/10 | (2018.01) |
| H04W 12/08 | (2009.01) |
| H04W 48/10 | (2009.01) |
| H04W 84/04 | (2009.01) |
| H04W 84/12 | (2009.01) |

(52) U.S. Cl.
CPC ...... *H04L 63/0272* (2013.01); *H04L 12/4641* (2013.01); *H04L 47/2433* (2013.01); *H04M 15/7556* (2013.01); *H04W 12/08* (2013.01); *H04W 48/10* (2013.01); *H04W 76/10* (2018.02); *H04W 84/042* (2013.01); *H04W 84/12* (2013.01)

(58) Field of Classification Search
CPC ..... H04L 63/0272; H04L 63/10; H04W 12/08
See application file for complete search history.

(56) References Cited

U.S. PATENT DOCUMENTS

| 7,298,702 | B1 | 11/2007 | Jones et al. |
| 8,077,689 | B1 | 12/2011 | Jones et al. |
| 8,400,990 | B1 | 3/2013 | Volpano |
| 2004/0208122 | A1* | 10/2004 | McDysan ........... H04L 12/4641 370/230 |
| 2005/0180429 | A1* | 8/2005 | Ghahremani ....... H04L 41/0654 370/395.21 |
| 2006/0153122 | A1* | 7/2006 | Hinman .................. H04L 63/10 370/328 |
| 2007/0033646 | A1* | 2/2007 | Tosey ...................... H04L 67/14 726/15 |

(Continued)

OTHER PUBLICATIONS

Anand Balachandran et al., Wireless Hotspots: Current Challenges and Future Directions, Jun. 2005, ACM, vol. 10 Issue 3, pp. 265-274.*

(Continued)

*Primary Examiner* — Kari L Schmidt
*Assistant Examiner* — Fahimeh Mohammadi
(74) *Attorney, Agent, or Firm* — Han Santos, PLLC

(57) ABSTRACT

Techniques are disclosed to increase security of a wireless access point (WAP). In embodiments, a cellular network provider has an arrangement with an owner of a WAP for cellular network customers to connect to the Internet through that WAP. The WAP may broadcast a SSID for cellular network customers only when a virtual private network (VPN) is established between the WAP and a server of the cellular network provider. If the VPN disconnects, then the WAP stops broadcasting this SSID until the VPN is re-established.

15 Claims, 6 Drawing Sheets

(56) References Cited

U.S. PATENT DOCUMENTS

| | | | |
|---|---|---|---|
| 2007/0127500 A1* | 6/2007 | Maeng | H04L 63/10 370/395.52 |
| 2007/0237159 A1* | 10/2007 | Yamada | H04L 12/2834 370/395.53 |
| 2008/0046995 A1* | 2/2008 | Satterlee | H04L 12/4679 726/15 |
| 2009/0222892 A1* | 9/2009 | Ueno | H04L 63/0272 726/3 |
| 2009/0310535 A1* | 12/2009 | Anumala | H04W 8/26 370/328 |
| 2010/0182959 A1* | 7/2010 | Cook | H04M 11/062 370/329 |
| 2012/0044914 A1* | 2/2012 | Chen | H04W 12/08 370/338 |
| 2013/0298192 A1* | 11/2013 | Kumar | G06F 21/52 726/3 |
| 2015/0135304 A1* | 5/2015 | Hatakeyama | H04L 63/0272 726/15 |
| 2015/0365381 A1 | 12/2015 | Durbin | |
| 2015/0365828 A1* | 12/2015 | Saida | H04M 3/00 455/411 |
| 2016/0164838 A1* | 6/2016 | Bi | H04L 63/0272 726/15 |

OTHER PUBLICATIONS

Noam Kogan et al., A Practical Revocation Scheme for Broadcast Encryption Using Smartcards, Aug. 2006, ACM, vol. 9 Issue 3, pp. 325-351.*

Milind M. Buddhikot et al., Design and Implementation of a WLAN/CDMA2000 Interworking Architecture, Nov. 10, 2003, IEEE, pp. 90-100.*

Frans Panken et al., Extending 3G/WiMAX Networks and Services through Residential Access Capacity, Dec. 10, 2007, IEEE, pp. 62-69.*

International Search Report and Written Opinion dated Apr. 17, 2017, for PCT Patent Application No. PCT/US2016/068573, 8 pages.

* cited by examiner

WIRELESS ACCESS POINT SECURITY

BACKGROUND

Wireless access points (WAPs) allow computing devices to establish a wireless communications connection through the WAP and to the Internet. A WAP may advertise its availability for connections by broadcasting a service set identifier (SSID) that may be detected via a computing device. Some WAPs broadcast multiple SSIDs, such as one for the owner of the WAP, which requires one password or set of credentials for authorization, and another for guests, which requires a different password or set of credentials for authorization (or even no credentials at all).

There are many problems with the security of current WAPs, some of which are well known.

BRIEF DESCRIPTION OF THE DRAWINGS

The Detailed Description is set forth with reference to the accompanying figures.

DETAILED DESCRIPTION

Figure 1:
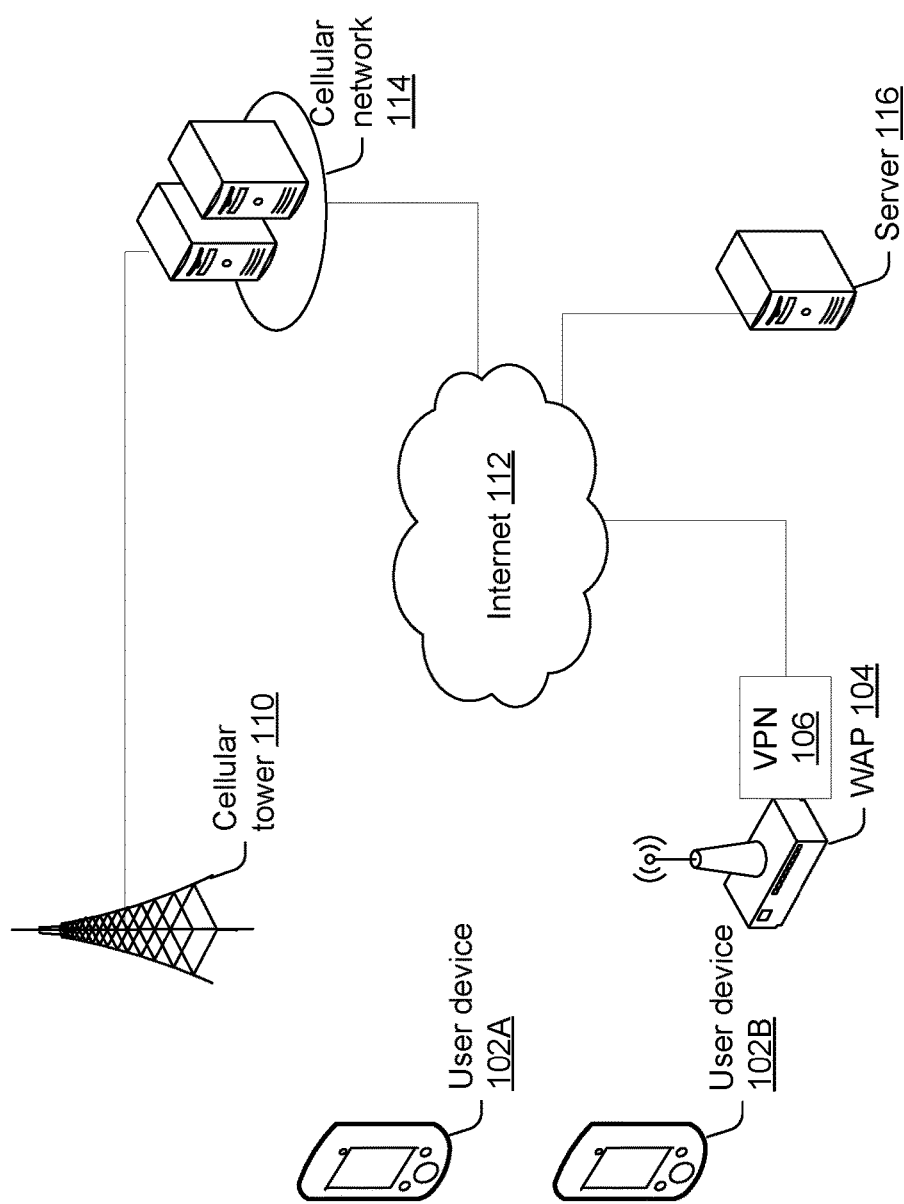
FIG. 1 is a top level diagram of a system architecture in which embodiments may be implemented.

Context of Wireless Access Point Security
Overview

This disclosure describes security for a wireless access point (WAP). It may be that a cellular network service provider has an arrangement with the owner of a WAP for cellular network customers to utilize the WAP to access the Internet from their user devices. In such a case, a man-in-the-middle attack (between the WAP and a modem that connects the WAP with the Internet) may be possible by inserting a snooping device between the WAP and the modem. It is possible to mitigate against this attack vector by establishing a virtual private network (VPN) between the WAP and a computing device of the cellular network provider.

This man-in-the-middle attack may be less likely in other architectures, such as where the WAP and modem are integrated into one piece of hardware (rather than being connected by an Ethernet cable, which allows a snooping device to be added to the Ethernet cable), or uses a coaxial cable, since there are fewer snooping devices that are configured to detect communications via coaxial cables.

In embodiments, a SSID that is used by user devices possessed by customers of the cellular network service provider is broadcast by the WAP when a VPN is established between the WAP and the computing device of the cellular network provider. If the VPN is disconnected, the WAP may stop broadcasting this SSID. If the VPN is re-established (or established for a first time), the WAP may resume broadcasting this SSID.

In embodiments, a user device is authorized to connect to the WAP via the SSID by the cellular network service provider. The user device may send a credential (such as an indication of a subscriber identity module—SIM—card) to the WAP, which forwards it to the cellular network service provider for authorization. The cellular network service provider may then send an indication of whether the user device is authorized back to the WAP, and the WAP may allow or deny the user device to access the Internet through the WAP, accordingly.

In general, a cellular connection may be considered to be a communications protocol that utilizes licensed spectrum, and a WAP with a Wi-Fi connection may be considered to be using a communications protocol that utilizes unlicensed spectrum. Licensed spectrum covers long distance, high power radiation emitters, which may include cellular base stations on standards such as Code Division Multiple Access 2000 ("CDMA2000"), Wideband Code Division Multiple Access ("W-CDMA"), High Speed Packet Access Plus ("HSPA+"), and Long Term Evolution ("LTE") base stations. For purposes of this patent application, licensed spectrum refers to any EMF that relates to frequencies whose use is amenable to long distance and/or high power radiation emission, as to be regulated by license by a government.

In contrast, relatively short distance/low power radiation emitters, have less risk of interfering with other user devices. While still regulated, these EMF frequencies are typically not subject to license. For example, in the United States, the Federal Communications Commission ("FCC") regulates unlicensed spectrum via Title 47 of the Code of Federal Regulations, Part 15 ("47 CFR 15").

Unlicensed emitters, include Wi-Fi, Bluetooth, cordless phones, and frequency modulation ("FM") bands for used for low-distance coverage encompassing a single business locale, a residence, or shorter. Also contemplated are transmitters which may have longer range capability but whose focus limits diffusion and therefore limits the potential to interfere with other communications. An example may include laser based communications where the laser intensity is sufficiently low not to cause health hazards. For purposes of this patent application, unlicensed spectrum refers to any EMF that relates to frequencies whose use is amenable to low-distance and/or low power radiation emission, as not to be regulated by license by a government.

WAP with VPN to Cellular Network

FIG. 1 is a top level diagram of a system architecture in which embodiments may be implemented. User devices 102A and 102B may be cellular telephones, laptop computers, or other devices that have wireless communications capabilities. As depicted, user devices 102A and 102B are able to communicate via Wi-Fi (with WAP 104) and cellular tower 110 (assuming that they are within range and properly authenticated).

WAP 104 is configured to broadcast multiple SSIDs. For example, WAP 104 may broadcast one SSID that requires entering a password, where the owner of WAP 104 sets the password. WAP 104 may also broadcast a second SSID that requires authenticating to cellular network 114. This second SSID may enable customers of cellular network 114 to increase the range and bandwidth of their network connectivity by also connecting to WAP 104 and other WAPs, where cellular network 114 has an agreement with the owners of these WAPs. In embodiments, it may be that the cellular network sells these WAPs in an effort to increase the range and bandwidth of their network's connectivity.

WAP 104 connects to Internet 112 via modem 108. The connection between WAP 104 and modem 108 may be an Ethernet cable, which may expose this architecture to more man-in-the-middle attacks than where they are connected via a coaxial cable or where the WAP and the modem are integrated into a single piece of hardware. A man-in-the-middle attack is one where an attacker observes and/or modifies communications between two entities that believe they are directly communicating with each other. There may be an increased exposure to a man-in-the-middle attack in this architecture because an attacker could fix a hub or other network equipment between WAP 104 and modem 108, and attach hardware to that hub or other network equipment that observes and/or modifies network traffic that passes through that hub or other network equipment.

A way to mitigate this risk of a man-in-the-middle attack is to establish a VPN 106 from WAP 104 to cellular network 114 (through modem 108 and Internet 112). A VPN may encrypt communications between user device 102B and cellular network 114 so that even if an attacker is able to stage a man-in-the-middle attack between WAP 104 and modem 108, the data is encrypted so that it likely cannot be observed in its unencrypted form, or modified without detection.

In some cases, a concern regarding a man-in-the-middle attack may be less than in others. For example, if the owner of WAP 104, or a guest who he gives the password to, affirmatively connects to WAP 104, they have likely considered the security risks involved with doing so.

However, where WAP 104 is also being used by cellular network 114 to increase the network's range and bandwidth, it may be that customers of cellular network 114 have user devices 102 that are configured to automatically connect to WAP 104 under certain conditions (such as when the cellular towers are at capacity). In these cases where a customer may not be affirmatively deciding to connect to a particular WAP, the customer may not have given conscious thought to the security issues involved, and it may be appropriate to offer increased security to the customer, such as to mitigate against a man-in-the-middle attack.

A way to mitigate against a man-in-the-middle attack is to use a VPN for all connections between these automatically-connecting user devices and cellular network 114. In embodiments then, a SSID that is used by these automatically-connecting user devices is broadcast only when a VPN has been established between WAP 104 and cellular network 114. That way, a user device will not automatically connect without a VPN being established, since there will be no SSID for it to connect with.

If WAP 104 attempts to broadcast such a SSID, it may first check to determine whether a corresponding VPN 106 exists. Where such a VPN 106 exists, it may then broadcast this SSID. Where such a VPN 106 does not exist, WAP 104 may first establish the VPN 106 before broadcasting this SSID. If the VPN 106 disconnects, WAP 104 may stop broadcasting this SSID for the duration that the VPN 106 is disconnected.

Also depicted in FIG. 1 is cellular network 114, which may be comprised of computer servers and other infrastructure for a cellular voice and data communications network. Cellular tower 110 may be additional infrastructure used by cellular network 114 to offer bandwidth to customer user devices. Cellular network 114 may be connected to Internet 112. Also depicted is server 116, which is connected to Internet 112. User devices 102A and 102B may retrieve data from server 116 via Internet 112 using their Wi-Fi connection with WAP 104.

Exemplary Hardware, Software and Communications Environment

Figure 2:
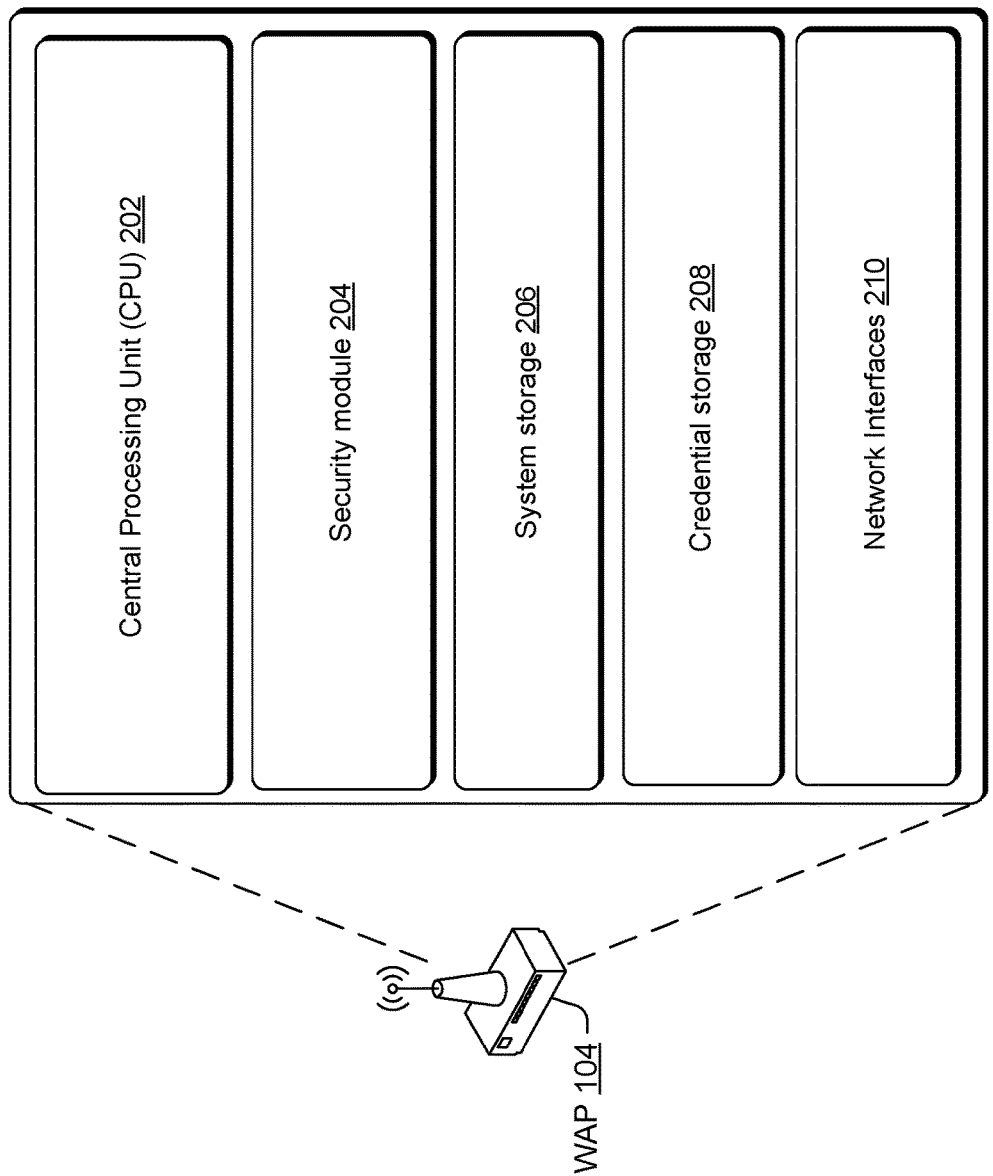
FIG. 2 is a block diagram of an exemplary hardware, software and communications environment in which embodiments may be implemented.

An exemplary hardware, software and communications environment is disclosed in FIG. 2. Hardware, software and communications environment 200 may be utilized for wireless access point security and related techniques. For example, aspects of WAP 104 may be implemented using environment 200 of FIG. 2.

Computing environment 200 may comprise central processing unit (CPU) 202, security module 204, system storage and memory 206, storage controller 208, and network interfaces 210. CPU 202 may comprise one or more processors, each having one or more cores. CPU 202 may be part of a system-on-a-chip (SoC)—an integrated circuit that includes multiple components of a computing device on one chip.

Security module 204 may be implemented in hardware, processor-executable instructions, or a combination of hardware and processor-executable instructions. Security module 204 may perform functions such as broadcasting a particular SSID only when a corresponding VPN is established; halting broadcast of the SSID when the corresponding VPN is no longer established; authenticating a user device to a network corresponding to the SSID; and prioritizing communications among multiple devices possibly utilizing multiple SSIDs.

Where security module 204 authenticates a user device to a network corresponding to a SSID, it may cache credentials from the user device in credential storage 208, or an indication of whether a user device is authorized that is from a cellular network in credential storage 208. In embodiments, credential storage 208 may be implemented in a similar manner as system storage and memory 206. In embodiments, security module 204 may implement the operating procedures depicted in FIGS. 3-6.

System storage and memory 206 may be any computer-readable media that may store several software components including an application and/or an operating system. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media (sometimes referred to as computer-readable storage media) includes transitory and non-transitory, volatile and non-volatile, removable and non-removable media implemented in any method or technology for storage of information such as computer readable instructions, data structures, program modules, or other data. Computer storage media includes, but is not limited to, random access memory (RAM), read-only memory (ROM), electrically erasable programmable read only memory (EEPROM), flash memory or other memory technology, compact disc read only memory (CD-ROM), digital video discs (DVDs; sometimes referred to as digital versatile discs) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 210. Network interface 210 may be one or more network interfaces including cellular, Ethernet, Wi-Fi, or any number of other physical and data link standard interfaces.

Figure 3:
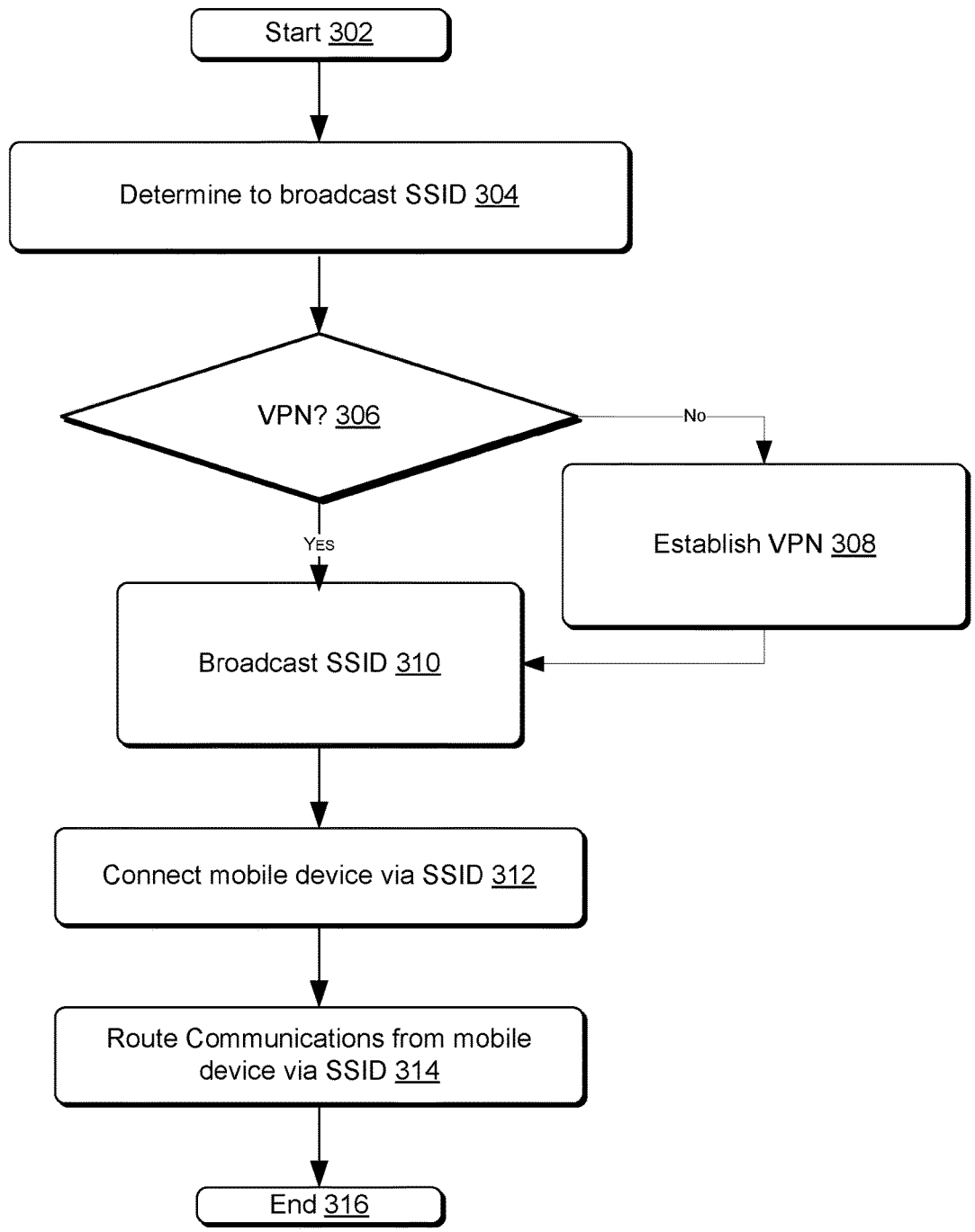
FIG. 3 depicts example operating procedures for establishing a SSID with a virtual private network (VPN).

Example Embodiments of Wireless Access Point Security Broadcasting a SSID with a Corresponding VPN FIG. 3 depicts example operating procedures for establishing a SSID with a corresponding virtual private network (VPN). In embodiments, WAP 104 of FIG. 1 may implement the operating procedures of FIG. 3, as WAP 104 establishes a VPN 106 with cellular network 114, and broadcasts a SSID that may be used by a user device 102B to connect to Internet 112 via WAP 104. It may be appreciated that there may be embodiments where one or more of the operating procedures of FIGS. 3-6 may be implemented by another device or system, such as cellular network 114 of FIG. 1.

It may be appreciated that the operating procedures of FIG. 3 (and FIGS. 4-6) are example operating procedures, and that there may be embodiments that implement more or fewer operating procedures, or that implement the operating procedures in a different order than are depicted. For example, there may be embodiments where there is an operation between operations 310 and 312 that determines whether the user device may connect via the SSID based on whether a threshold number of user devices are already connected via the SSID.

It may also be appreciated that the operating procedures of each of FIGS. 3-6 may be implemented in conjunction with each other. For example, the operating procedures of FIG. 3 may be implemented to establish communications with a wireless device, and then once those communications are established, the operating procedures of FIG. 6 may be used to prioritize communications with that user device, for example as part of operation 314 (which depicts routing communications from the user device).

The operating procedures of FIG. 3 begin with operation 302, and move to operation 304. Operation 304 depicts the WAP determining to broadcast a SSID. This may occur, for example, when the WAP is powered on, or in response to the WAP receiving user input indicative of broadcasting the SSID.

This SSID to be broadcast may be a SSID that is used by user devices possessed by customers of cellular network 114, where cellular network 114 has an agreement with an operator of the WAP that its customers may use the WAP to access the Internet 112. The WAP may also be broadcasting one or more other SSIDs, such as one used primarily by the operator of the WAP (with a password or other credential that he or she establishes). In embodiments, operation 304 may comprise the WAP determining to broadcast a SSID for a guest WAN for communications with a cellular telephone that can communicate with a cellular network. In embodiments, operation 304 may comprise the WAP determining to broadcast a SSID for communications with a user device that is configured to communicate with a cellular network After operation 304, the operating procedures of FIG. 3 move to operation 306.

Operation 306 depicts determining whether a VPN is established. In embodiments, this may comprise the WAP attempting to send a data packet to cellular network 114 via VPN 106. If the WAP receives an acknowledgment from cellular network 114 that the packet was received (sometimes called an ACK), then the WAP may determine that the VPN 106 is established. However, should the WAP not receive such an acknowledgement within a predetermined amount of time (sometimes referred to as a timeout period), then the WAP may determine that the VPN 106 is not established, or is disconnected.

In embodiments, operation 306 comprises the WAP determining that a VPN connection is not established between the WAP and a computing device of the cellular network in response to determining to broadcast the SSID. If in operation 306 the WAP determines that a VPN is not established, the operating procedures of FIG. 3 move to operation 308. Instead, if in operation 306 the WAP determines that a VPN is established, the operating procedures of FIG. 3 move to operation 310.

Operation 308 is reached from operation 306 where the WAP determines that a VPN is not established. Operation 308 depicts the WAP establishing a VPN. This may comprise the WAP sending a communication to cellular network 114 via Internet 112 that indicates a desire to establish VPN 106. A series of communications may take place between the WAP and cellular network 114, such as exchanging credentials. Examples of VPNs that might be established include an Internet Protocol Security (IPSec) connection, and a Secure Socket Layer/Transport Layer Security (SSL/TLS) connection. In embodiments, operation 308 comprises the WAP establishing a VPN with a computing device of the cellular network in response to determining to broadcast the SSID. After operation 308, the operating procedures of FIG. 3 move to operation 310.

Operation 310 is reached from operation 308, or from operation 306 where the WAP determines that a VPN is established. Operation 310 depicts the WAP broadcasting the SSID. This may comprise, for example, the WAP broadcasting a known manner on a known radio frequency (or frequencies) to indicate to user devices capable of receiving and processing these frequencies that there is an available network to connect to. The WAP may broadcast the SSID according to an Institute of Electrical and Electronics Engineers (IEEE) 802.11 standard. In embodiments, operation 310 may comprise the WAP broadcasting the SSID for the guest WAN after establishing the VPN between the WAP and the computing device of the cellular network. In embodiments, operation 310 may comprise the WAP broadcasting the SSID after establishing the VPN. After operation 310, the operating procedures of FIG. 3 move to operation 312.

Operation 312 depicts the WAP connecting to the user device via the SSID. In embodiments, this may comprise the user device sending a request to the WAP to connect to the WAP, using the SSID information that the WAP is broadcasting. In response, the WAP may authorize the user device to connect to the WAP.

In embodiments, the WAP authorizing the user device to connect to the WAP comprises the user device sending a SIM card credential to the WAP. This SIM card credential may be a credential that the user device uses to authenticate to cellular network 114, such as then to transmit data with cellular tower 110. The WAP may then forward an indication of the credential to cellular network 114. Cellular network 114 may then determine whether the user device is authorized to communicate with the WAP, such as by checking the credential against a database of authorized user credentials that cellular network 114 maintains. Cellular network 114 may then send an indication of whether the user device is authorized to the WAP. In embodiments, this authorization process is performed between the WAP and cellular network 114 using a different communication channel than VPN 106, and this different communication channel may comprise a different VPN. In embodiments, operation 312 comprises the WAP establishing a wireless connection with the cellular telephone via the SSID.

In embodiments, the WAP authorizing the user device to the WAP may include authorizing based on a SIM credential of the user device. This authorization may be done by the cellular network, and the WAP may receive a SIM credential from the user device, route it to the cellular network, and receive an indication from the cellular network of whether the user device is authorized to communicate via this SSID. It may be that this communication channel between the WAP and the cellular network that is used to authorize the SIM credential is a separate communication channel from VPN 106. Put another way, operation 312 may comprise the WAP receiving a SIM card credential of the user device before routing data received by the user device via the SSID to the VPN, the WAP transmitting an indication of the SIM card credential to a cellular network associated with the SIM card credential, and the WAP receiving an indication from the cellular network that the SIM card credential is authorized for communications via the SSID. The WAP transmitting the indication of the SIM card credential to a cellular network associated with the SIM card credential may be performed independently of the VPN. And the WAP may cache the SIM card credential and/or the indication of whether the user device is authorized, which may include storing the indication that the SIM card credential is authorized for communications via the SSID for a predetermined period of time. After operation 312, the operating procedures of FIG. 3 move to operation 314.

Operation 314 depicts the WAP routing communications from the user device via the VPN. This may comprise the WAP forwarding data communications received from user device 102B and directed to cellular network 114 through VPN 106 to cellular network 114, and directing communications to user device 102B that are received from cellular network 114 and received through VPN 106 that are directed to user device 102B. In embodiments, it may be that communications directed by user device 102B to other computing devices (such as server 116) are first routed by WAP 104 to cellular network 114 through VPN 106.

In embodiments, operation 314 comprises the WAP routing communications received from the cellular telephone via the wireless connection through the VPN to the computing device of the cellular network. In embodiments, operation 314 comprises the WAP determining that a total number of user devices using the SSID is below a predetermined threshold number before routing data received from the user device via the SSID to the VPN. In embodiments, operation 314 may comprise the WAP broadcasting a second SSID, and routing data received from a second user device via the second SSID independently of the VPN. This might be, for example, a SSID for an owner of the WAP that is accessed by the owner's user device.

After operation 314, the operating procedures of FIG. 3 move to operation 316, where the operating procedures of FIG. 3 end.

Halting SSID Broadcast When VPN is Disconnected

Figure 4:
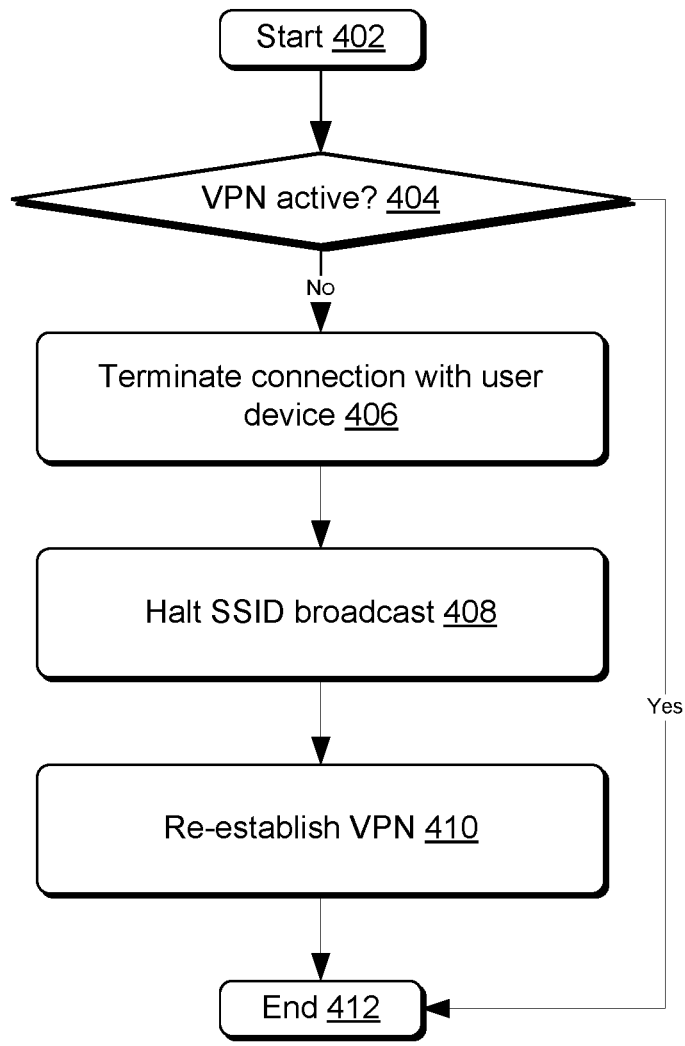
FIG. 4 depicts example operating procedures for halting broadcast of a SSID when a corresponding VPN connection is lost.

FIG. 4 depicts example operating procedures for halting broadcast of a SSID when a corresponding VPN connection is lost. In embodiments, the operating procedures of FIG. 4 may be implemented by WAP 104 of FIG. 1 to stop broadcasting a SSID when VPN 106 with cellular network 114 becomes disconnected.

The operating procedures of FIG. 4 begin with operation 402 and move to operation 404. Operation 404 depicts the WAP determining whether a VPN is active. In embodiments, the WAP may perform operation 404 in a similar manner as operation 306 of FIG. 3. In embodiments, operation 404 comprises the WAP determining that the VPN between the WAP and the computing device of the cellular network is no longer established. If in operation 404 the WAP determines that a VPN is active, then the operating procedures of FIG. 4 move to operation 412, where the operating procedures of FIG. 4 end. Instead, if the WAP determines in operation 404 that a VPN is not active, then the operating procedures of FIG. 4 move to operation 406.

Operation 406 is reached from operation 404 where the WAP determines that a VPN is not active. Operation 406 depicts the WAP terminating a connection with any user devices that are connected via the SSID. This may comprise the WAP dropping any network packets that the WAP receives that are directed to those user devices, and declining to forward any network packets to their destination that are received from the WAP from those user devices. In embodiments, operation 406 comprises the WAP terminating the wireless connection with the cellular telephone via the SSID in response to determining that the VPN is no longer established. After operation 406, the operating procedures of FIG. 4 move to operation 408.

Operation 408 depicts the WAP halting broadcast of the SSID. In embodiments, this may comprise the WAP terminating broadcasting in a known manner on a known frequency to advertise the SSID. This may be considered to be a counterpart to operation 310 of FIG. 3, which depicts the WAP broadcasting a SSID. In embodiments, operation 408 comprises the WAP halting broadcast of the SSID in response to determining that the VPN is no longer established. In embodiments where the WAP is broadcasting multiple SSIDs, operation 408 may comprise the WAP stopping broadcast of just the SSID associated with the VPN. That is, operation 408 may comprise the WAP halting broadcast of the SSID, and maintaining broadcast of the second SSID, in response to determining that the VPN is no longer established. After operation 408, the operating procedures of FIG. 4 move to operation 410.

Operation 410 depicts the WAP re-establishing the VPN. In embodiments, the WAP may perform operation 410 in a similar manner as operation 308 of FIG. 3. In embodiments, operation 410 comprises the WAP re-establishing the VPN after determining that the VPN is no longer established, and, in response to re-establishing the VPN, resuming broadcast of the SSID for the guest WAN. After operation 410, the operating procedures of FIG. 4 move to operation 412, where the operating procedures of FIG. 4 end.

Authenticating a User device to the Wireless Access Point

Figure 5:
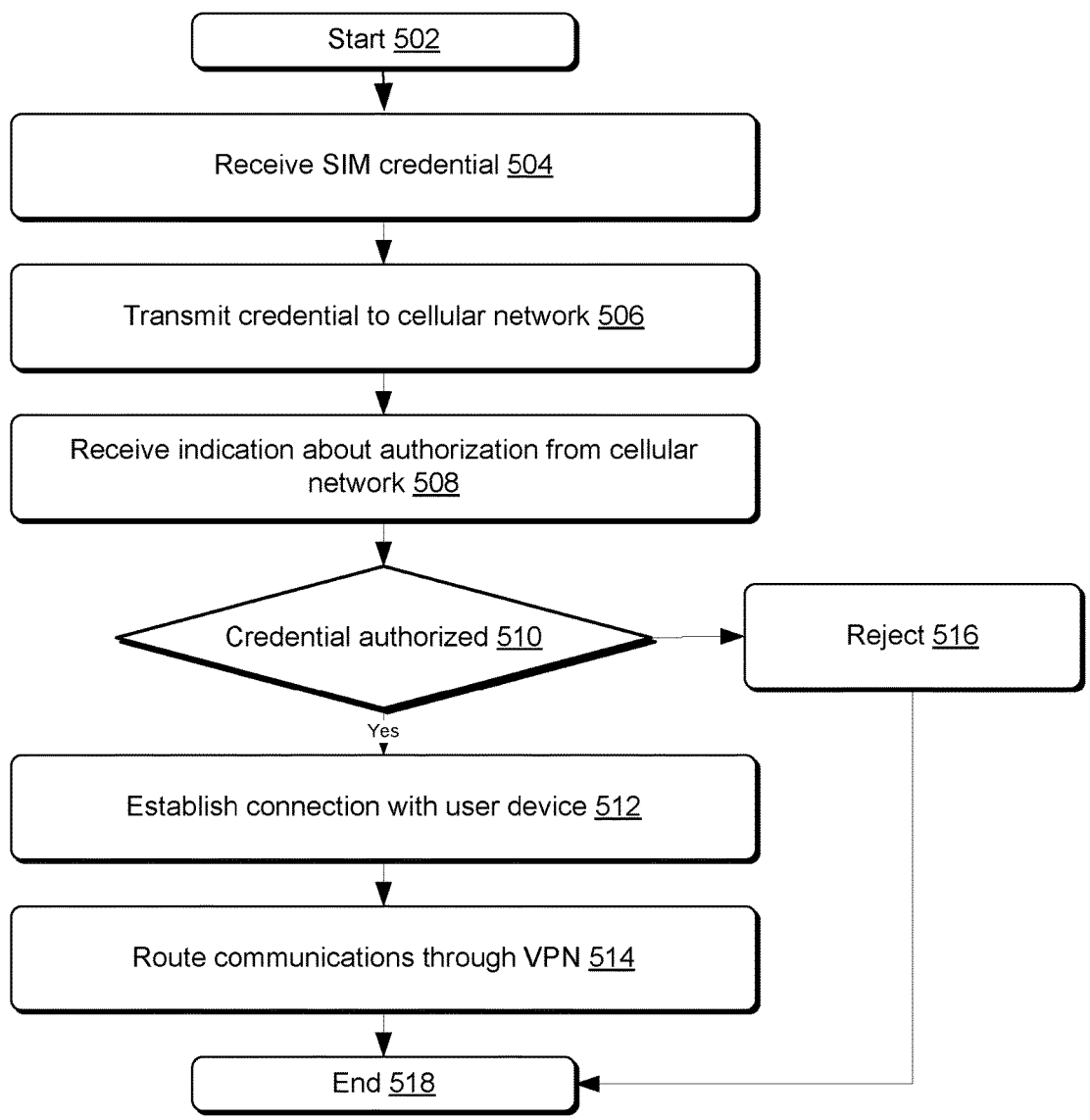
FIG. 5 depicts example operating procedures for authenticating a user device to a SSID with a corresponding VPN.

FIG. 5 depicts example operating procedures for authenticating a user device to a SSID with a corresponding VPN. In embodiments, WAP 104 may perform the operating procedures of FIG. 5 as it authenticates user device 102B to a SSID that corresponds to VPN 016.

The operating procedures of FIG. 5 begin with operation 502 and move to operation 504. Operation 504 depicts the WAP receiving a SIM credential. In embodiments, a user device may contain a SIM card that uniquely identifies it and may contain an authorization credential. In other embodiments, a SIM card may be integrated into a user device's hardware rather than being a removable card, may be implemented in computer-executable instructions that are executed by the user device, or may be implemented by a combination of hardware and computer-executable instructions.

The WAP may receive the SIM credential may be as part of an authentication process with user device 102B where the WAP and user device 102B perform the authentication process in accordance with a wireless communications protocol, such as one according to an IEEE 802.11 standard. In embodiments, the authentication process may proceed according to a Remote Authentication Dial-In User Service (RADIUS), or Diameter authentication protocol. After operation 504, the operating procedures of FIG. 5 move to operation 506.

Operation 506 depicts the WAP transmitting the SIM credential to the cellular network. In an embodiment, this may comprise WAP 104 transmitting the SIM credential that it received in operation 504 to cellular network 114. In embodiments, this may comprise the WAP transmitting the SIM credential as it was received from user device 102B. In other embodiments, it may comprise the WAP performing an operation on the SIM credential before transmitting it, such as transmitting a portion of the SIM credential, or encrypting the SIM credential. These embodiments may collectively be referred to as transmitting an indication of the SIM credential. In embodiments, this communication between the WAP and cellular network 114 may occur on a communications channel separate from VPN 106. In embodiments, this separate communication channel may also comprise a VPN. After operation 506, the operating procedures of FIG. 5 move to operation 508.

Operation 508 depicts the WAP receiving an indication about whether the SIM credential is authorized from the cellular network. This may comprise cellular network 114 having received an indication of the SIM credential, determining if it is authorized for communication with the WAP. For example, cellular network 114 may compare the received indication of a SIM credential and determined whether it matches an entry in a database of SIM credentials that are authorized to access the Internet 112 via the SSID (such as because those SIM credentials belong to active customers of cellular network 114). Cellular network 114 may send this indication to the WAP by the communications channel used between the WAP and cellular network 114 in operation 506. After operation 508, the operating procedures of FIG. 5 move to operation 410.

Operation 510 depicts the WAP determining whether the credential is authorized. This may comprise the WAP analyzing the communication received from cellular network 114 in operation 508 to determine whether or not the indication is that the credential is authorized. If in operation 510 the WAP determines that the credential is authorized, then the operating procedures of FIG. 5 move to operation 512. Instead, if in operation 510 the WAP determines that the credential is not authorized, then the operating procedures of FIG. 5 move to operation 516.

Operation 512 is reached from operation 510 where the WAP determines that the credential is authorized. Operation 512 depicts the WAP establishing a connection with the user device. In embodiments, the WAP may perform operation 512 in a similar manner as operation 312 of FIG. 3. After operation 512, the operating procedures of FIG. 5 move to operation 514.

Operation 514 depicts the WAP routing communications from the user device through the VPN. In embodiments, the WAP may perform operation 514 in a similar manner as operation 314 of FIG. 3. After operation 514, the operating procedures of FIG. 5 move to operation 518, where the operating procedures of FIG. 5 end.

Operation 516 is reached from operation 510 where the WAP determines that the credential is not authorized. Operation 516 depicts the WAP rejecting the user device. In embodiments, this may comprise the WAP indicating via the protocol used between the WAP and user device 102B that user device 102B is not authorized to communicate with the WAP via the SSID. After operation 516, the operating procedures of FIG. 5 move to operation 518, where the operating procedures of FIG. 5 end.

Prioritizing Network Communications

Figure 6:
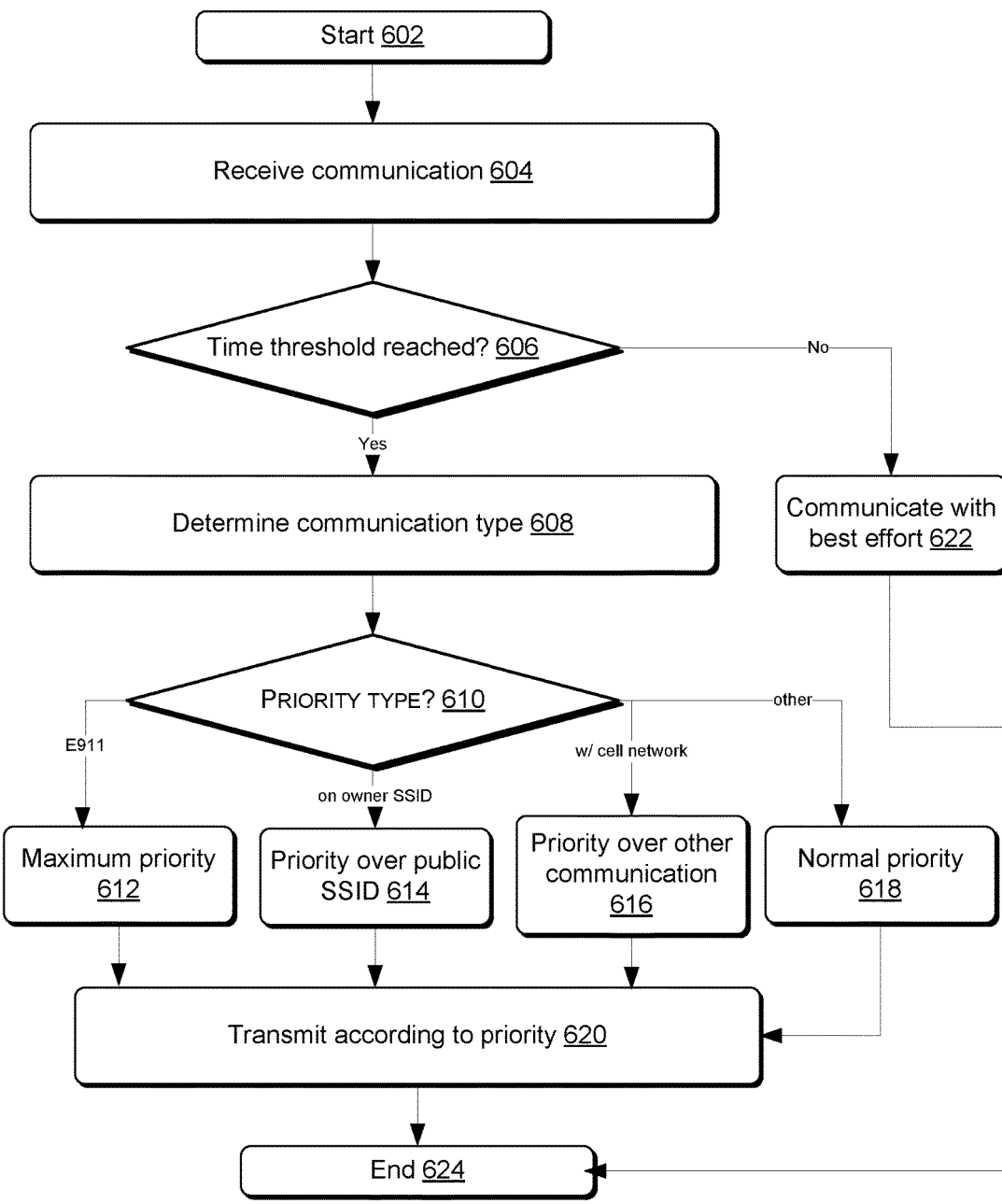
FIG. 6 depicts example operating procedures for prioritizing network communications for embodiments.

FIG. 6 depicts example operating procedures for prioritizing network communications for embodiments. In embodiments, the operating procedures of FIG. 6 may be implemented to prioritize communications with user device 102B after communications with user device 102B have been established as part of the operating procedures of FIG. 3. The operating procedures of FIG. 6 may be implemented to prioritize other communications, as well, such as those received from a user device that is connected to WAP 104 using a separate SSID than the one primarily described with respect to FIG. 3. There may be multiple user device connected to WAP 104 (using one or more SSIDs) that are vying for limited bandwidth. Where the request for bandwidth exceeds the available bandwidth, prioritizing the various communications may be useful.

The operating procedures of FIG. 6 begin with operation 602 and move to operation 604. Operation 604 depicts the WAP receiving a communication. This may be a communication received from user device 102B that is directed to cellular network 114 via VPN 106, or a communication received from cellular network 114 that is directed to user device 102B and that is received via VPN 106. After operation 604, the operating procedures of FIG. 6 move to operation 606.

Operation 606 depicts the WAP determining whether a threshold amount of time for the communication has been reached. It may be that prioritization is applied to traffic when it is sustained for some predetermined amount of time (such as at least two seconds), and that traffic that is sustained for a shorter period of time is not prioritized, and is instead delivered with best effort.

Operation 606 may comprise the WAP determining that a series of packets are part of one communication because they have the same source and destination, and further determining that they are part of one communication if there is not a second predetermined amount of time separating receiving any two packets received with the same source and destination. Where in operation 606 the WAP determines that a threshold amount of time for the communication has been reached, the operating procedures of FIG. 6 move to operation 608. Instead, where in operation 606 the WAP determines that the threshold amount of time for the communication has been not reached, the operating procedures of FIG. 6 move to operation 622.

Operation 608 is reached from operation 606 where the WAP determines that a threshold amount of time for the communication has been reached. This may indicate that a series of packets is part of one communication because these packets have the same source and destination, and are being received in close temporal proximity.

Operation 608 depicts the WAP determining a type of the communication. The type of communication may be, for example, whether the communication is part of an Enhanced 911 (E911) communication; which user device connected to WAP 104 is involved in the communication (e.g., is the user device communicating using a SSID associated with an owner of the WAP, or a SSID associated with a customer of cellular network 114); whether the traffic is directed to cellular network 114 as an ultimate destination, or has some other ultimate destination like server 116 (and the traffic destined for server 116 may first pass through cellular network 114); or whether the traffic is associated with voice or data (or some specific data type, like video, or email). The communication may be encrypted, but a data type may still be determined by looking at patterns in the encrypted traffic. For example, encrypted communications that carries video may typically correspond to a different number of packets being received per second, a different number of total packets being transferred, a different packet size, or a different destination than encrypted traffic that corresponds to email. In embodiments, looking at patterns in encrypted traffic (or non-encrypted traffic) may comprise determining a type of communication based on a pattern of traffic in the communication and a destination of the communication, determining a priority for the communication based on the type of communication, and transmitting the communication according to the determined priority. After operation 608, the operating procedures of FIG. 6 move to operation 610.

Operation 610 depicts the WAP determining a priority type for the communication. Where in operation 610 the WAP determines that the priority type is E911, the operating procedures of 610 move to operation 612. Instead, where in operation 610 the WAP determines that the priority type is ownership, the operating procedures of FIG. 6 move to operation 614. Instead, where in operation 614 the WAP determines that the priority is communicating with the cellular network, the operating procedures of FIG. 6 move to operation 616. Instead, where the WAP determines that the priority is some other type, the operating procedures of FIG. 6 move to operation 620.

Operation 612 is reached from operation 610 where the WAP determines that the priority type is E911. Operation 612 depicts the WAP assigning a maximum priority to the communication. In such a case, the WAP may give E911 communications a bandwidth priority above all other communications handled by the WAP, and treated accordingly. In embodiments, operation 612 may comprise the WAP prioritizing transmitting a communication for E911 over transmitting another communication. After operation 612, the operating procedures of FIG. 6 move to operation 620.

Operation 614 is reached from operation 610 where the WAP determines that the priority type is ownership. Operation 614 depicts the WAP assigning a priority to the communication that is greater than communications via the public SSID. That is, where the owner of the WAP is using the WAP at the same time that cellular network 104 customers are using the WAP, the WAP may prioritize communications from the owner over communications from cellular network 104 customers. In embodiments, operation 614 may comprise the WAP prioritizing transmitting a communication received via a second SSID that is associated with an owner of the computing device over a communication received via the SSID. After operation 614, the operating procedures of FIG. 6 move to operation 620.

Operation 616 is reached from operation 610 where the WAP determines that the priority type is communication with the cellular network. It may be that the WAP gives priority to communications directed to the cellular network 114 over communications that terminate at a different location, such as server 116 (though those communications may be routed through cellular network 114). In operation 616, the WAP assigns that priority accordingly. It may be that there are reasons why particular traffic is given a different priority. For example, there may be embodiments where all owner traffic (as discussed with regard to operation 614) is given priority over all cellular network 114 customer traffic, even if the customer traffic is directed to cellular network 114 and the owner traffic is not. Operation 616 depicts the WAP assigning a priority to the communication that is greater than communications that are not with the cellular network. In embodiments, operation 616 comprises the WAP prioritizing transmitting a communication destined to, or originated from, a computing device of the cellular network. After operation 616, the operating procedures of FIG. 6 move to operation 620.

Operation 618 is reached from operation 610 where the WAP determines that the priority type is other. Operation 618 depicts the WAP assigning a normal priority to the communication. In embodiments, there may be additional levels of priority to assign based on different criteria (such as a type of communications, like video or email), and communications may be accordingly prioritized with even more granularity. After operation 618, the operating procedures of FIG. 6 move to operation 620.

Operation 620 is reached from operations 612, 614, 616, and 618. Operation 620 depicts the WAP transmitting the communication according to its priority, as determined in operations 612-618. After operation 620, the operating procedures of FIG. 6 move to operation 624, where the operating procedures of FIG. 6 end.

Operation 622 is reached from operation 606 where the WAP determines in operation 606 that the threshold amount of time for the communication has been not reached. Operation 622 depicts the WAP transmitting the communication with best effort. That is, if the communication is a short one (e.g., under 2 seconds in length), it may be that prioritization is not utilized, and all of this short communication is transmitted with best effort. In embodiments, operation 622 may comprise the WAP determining a priority for transmitting a communication where the communication has been active for over a predetermined amount of time, and transmitting the communication according to the determined priority. After operation 622, the operating procedures of FIG. 6 move to operation 624, where the operating procedures of FIG. 6 end.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for securing a wireless access point (WAP) for Wireless Fidelity (Wi-Fi) communications for guest access by a user device to a cellular network, comprising:
    determining, by the WAP, to broadcast a service set identifier (SSID) for a guest wireless access network (WAN) for wireless communications with the user device;
    establishing, by the WAP, a virtual private network (VPN) connection between the WAP and the cellular network;
    broadcasting, by the WAP, the SSID for the guest WAN in response to establishing the VPN connection between the WAP and the cellular network;

establishing, by the WAP, a wireless connection with the user device via the SSID;
receiving a subscriber identity module (SIM) card credential of the user device, the SIM card credential corresponding to a credential that authenticates the user device to the cellular network;
transmitting a first indication of the SIM card credential to the cellular network via a communication channel that is different from a communication channel utilized for the VPN connection;
receiving a second indication from the cellular network that the SIM card credential is authorized for communications via the SSID;
receiving, at the WAP, a communication from the user device via the wireless connection, wherein the communication is directed to the cellular network;
routing, by the WAP, the communication via the VPN connection to the cellular network, wherein routing the communication comprises encrypting, by the VPN connection, the received communication;
determining, by the WAP, that the VPN connection between the WAP and the cellular network is no longer established; and
halting the broadcasting, by the WAP, of the SSID in response to determining that the VPN connection is no longer established.

2. The method of claim 1, further comprising:
in response to determining, by the WAP, that the VPN connection is no longer established, terminating the wireless connection with the user device.

3. The method of claim 1, further comprising:
after determining that the VPN connection is no longer established, re-establishing, by the WAP, the VPN connection; and
in response to re-establishing the VPN connection, resuming broadcast of the SSID for the guest WAN.

4. A wireless access point (WAP), comprising:
at least one processor; and
at least one memory communicatively coupled to the at least one processor, the at least one memory storing processor-executable instructions that, upon execution by the at least one processor, direct the WAP to:
determine to broadcast a service set identifier (SSID) for wireless communications with a user device that is configured to communicate with a cellular network;
in response to determining to broadcast the SSID, establish a virtual private network (VPN) connection between the WAP and the cellular network;
broadcast the SSID in response to establishing the VPN connection between the WAP and the cellular network;
establish a wireless connection with the user device via the SSID;
receive a subscriber identity module (SIM) card credential of the user device, the SIM card credential corresponding to a credential that authenticates the user device to the cellular network;
transmit a first indication of the SIM card credential to the cellular network via a communication channel that is different from a communication channel utilized for the VPN connection;
receive a second indication from the cellular network that the SIM card credential is authorized for communications via the SSID;
receive a communication from the user device via the wireless connection;
route the communication received from the user device, wherein routing the communication comprises, encrypting the received communication for transmission via the VPN connection;
determine that the VPN connection between the WAP and the cellular network is no longer established; and
stop the broadcasting, by the WAP, of the SSID in response to determining that the VPN connection is no longer established.

5. The WAP of claim 4, wherein the at least one memory further stores processor-executable instructions that, upon execution by the at least one processor, further direct the WAP to:
before routing the communication received from the user device, determine that a total number of user devices using the SSID is below a predetermined threshold number.

6. The WAP of claim 4, wherein the at least one memory further stores processor-executable instructions that, upon execution by the at least one processor, further direct the WAP to:
broadcast a second SSID; and
route data received from a second user device via the second SSID independently of the VPN connection.

7. The WAP of claim 6, wherein the at least one memory further stores processor-executable instructions that, upon execution by the at least one processor, further direct the WAP to:
in response to determining that the VPN connection is no longer established, maintaining broadcasting of the second SSID.

8. The WAP of claim 4, wherein the at least one memory further stores processor-executable instructions that, upon execution by the at least one processor, further direct the WAP to:
store the second indication that the SIM card credential is authorized for communications via the SSID for a predetermined period of time.

9. A non-transitory computer-readable storage medium, storing computer-executable instructions that, when executed by a processor of a wireless access point (WAP), direct the WAP to:
determine to broadcast a service set identifier (SSID) for communications with a user device;
in response to determining to broadcast the SSID, establish a virtual private network (VPN) connection between the WAP and a cellular network;
in response to establishing the VPN connection, broadcast the SSID in response to establishing the VPN connection;
establish a wireless connection with the user device via the SSID;
receive a subscriber identity module (SIM) card credential of the user device, the SIM card credential corresponding to a credential that authenticates the user device to the cellular network;
transmit a first indication of the SIM card credential to the cellular network via a communication channel that is different from a communication channel utilized for the VPN connection;
receive a second indication from the cellular network that the SIM card credential is authorized for communications via the SSID;
receive a communication from the user device via the wireless connection;
route the communication received from the user device via the wireless connection to the cellular network via the VPN connection, wherein routing the communication comprises encrypting the communication for transmission via the VPN connection;
determine that the VPN connection between the WAP and the cellular network is no longer established; and
stop the broadcasting, by the WAP, of the SSID in response to determining that the VPN connection is no longer established.

10. The non-transitory computer-readable storage medium of claim 9, wherein a destination of the communication corresponds to an enhanced 911 (E911).

11. The non-transitory computer-readable storage medium of claim 9, wherein the communication is received via a second SSID that is associated with an owner of the WAP, and further storing computer-executable instructions that, when executed by the processor, further direct the WAP to:
prioritize transmission of the communication over another communication received via the SSID.

12. The non-transitory computer-readable storage medium of claim 9, further storing computer-executable instructions that, when executed by the processor, further direct the WAP to:
prioritize the transmission of the communication over another communication that is destined to, or originated from, a computing device of the cellular network.

13. The non-transitory computer-readable storage medium of claim 9, further storing computer-executable instructions that, when executed by the processor, further direct the WAP to:
determine the communication has been active for over a predetermined amount of time, and
prioritize the transmission of the communication based at least in part on the communication being active for over the predetermined amount of time.

14. The non-transitory computer-readable storage medium of claim 9, wherein the communication is encrypted, and further storing computer-executable instructions that, when executed by the processor, further direct the WAP to:
determine a type of communication based on a pattern of traffic in the communication and a destination of the communication, and
prioritize a transmission of the communication based at least in part on the type of communication.

15. The non-transitory computer-readable storage medium of claim 9, further storing computer-executable instructions that, when executed by the processor, further direct the WAP to:
after determining that the VPN connection is no longer established, re-establishing the VPN connection; and
in response to re-establishing the VPN connection, resuming broadcast of the SSID.

* * * * *